United States Patent
Teich

[15] 3,671,934

[45] June 20, 1972

[54] AUTOMOBILE THEFT ALARM FOR DETECTING UNAUTHORIZED ENERGIZATION OF RESISTIVE LOAD

[72] Inventor: Rudor M. Teich, 6040 Boulevard East, West New York, N.J. 07903

[22] Filed: Nov. 2, 1970

[21] Appl. No.: 86,222

[52] U.S. Cl. ............................................ 340/63, 340/253 P
[51] Int. Cl. ................................................... B60r 25/10
[58] Field of Search .............. 340/63, 64, 65, 248, 253, 276; 307/10; 180/114

[56] References Cited

UNITED STATES PATENTS

| | | | |
|---|---|---|---|
| 3,533,064 | 10/1970 | Perelman | 340/63 |
| 3,569,929 | 3/1971 | Wood | 340/63 |
| 3,422,398 | 1/1969 | Rubin | 340/63 |

*Primary Examiner*—Alvin H. Waring
*Attorney*—James and Franklin

[57] ABSTRACT

This invention relates to a method and device for detecting and indicating the unauthorized entry into an automobile, the unauthorized use of an automobile, and/or the unauthorized removal of an accessory of an automobile. In this invention, a voltage sensing device designed to operate only when the rate-of-change of a potential being sensed is greater than a predetermined value such as would occur when a resistive load is connected across the terminals of a battery. The rate-of-change voltage sensing device is coupled to monitor the voltage from the battery of a car. The rate-of-change voltage sensing device is not sensitive to and does not indicate the mere physical phenomena of a reduction in the battery terminal voltage. An inductive load such as motor or a coil, while it does result in a drop of battery terminal voltage, does not produce a pulse signal having a substantial rate-of-change and, therefore, will not initiate activation of the voltage sensing device. Thus, the voltage sensing device, when connected to a car battery, is selectively sensitive to the coupling of resistive loads to the battery, and insensitive to the operation of a normally operating accessory such as an electric clock.

15 Claims, 1 Drawing Figure

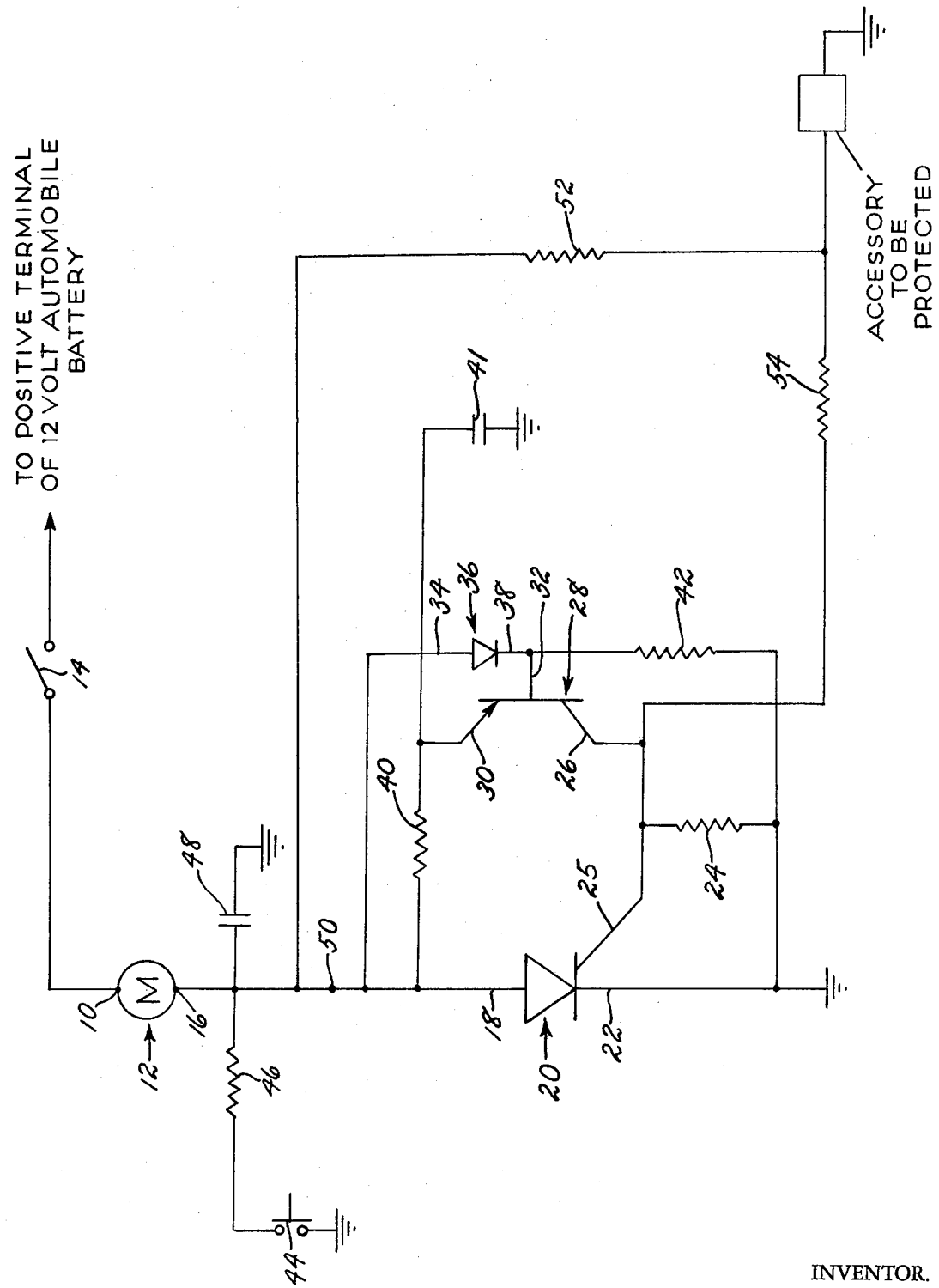

AUTOMOBILE THEFT ALARM FOR DETECTING UNAUTHORIZED ENERGIZATION OF RESISTIVE LOAD

BACKGROUND OF THE INVENTION

1. Field of the Invention

This invention relates generally to automotive alarm systems and more particularly to an automotive alarm system having a rate-of-change voltage sensing means which is coupled to monitor the potential across an automobile battery. The rate-of-change voltage sensing means is activated only when the voltage across the battery exhibits a rate change that is greater than a predetermined value such as occurs when resistive loads are coupled to the battery; and insensitive to the coupling of inductive loads to the battery.

2. Description of the Prior Art

Siren operated automotive burglar alarms have been in use for a considerable time. Usually a latching relay, activated by the closure of a pair of contacts, couple the siren to the car battery. The latching relay is required for two reasons; one, to handle the large current required to operate the siren; and, two, to maintain the siren operative if the contacts should subsequently be opened. A master switch which can be key operated or concealled is almost always provided to reset the alarm by deactivating the latching relay. This system is expensive to install as each opening of the car must be provided with a pair on contacts. At best, this system provides only perimeter protection as an intruder may enter a car by breaking a window and crawling through the window. Once inside the car, the intruder is free to drive away without attracting attention.

Another type of automotive burglar alarm senses the voltage drop (not the rate-of-change of the potential) across the terminals of the car battery when current is drawn. In this type of device, the opening of a door which activates the courtesy lights, the turning on of the head lights, and the stepping on the brake which activates the stop lights will be sensed by the alarm. These alarms are easier to install than the first mentioned type of automotive alarms. Unfortunately, however, this type of automotive alarm is very vulnerable to false alarms. For example, alarms of this type have been activated by nearby radio transmission, extremes of temperature and, the winding action of the automobile clock.

SUMMARY OF THE INVENTION

Briefly, this invention relates to a method and device for detecting the entry into an automobile, use of an automobile, or removal of an accessory from an automobile. In this invention a rate-of-change voltage sensing device which is coupled to monitor the voltage across an automobile battery is designed to operate only when the rate-of-change of the potential across the automobile battery is greater than a predetermined valve. The coupling of a resistive load to the battery will generate a potential pulse having a rate-of-change sufficient to activate the sensing device. In those instances where an inductive load is coupled to the automotive battery, the rate-of-change voltage sensing device will remain inactive. A single transistor network is provided which senses the rate-of-change voltage drop across an automobile battery, amplifies it, filters false triggering information from undesired sources such as the automobile clock, and has sufficient power to drive a high power SCR, triac or the like to activate a siren. Additionally, the network of the invention is temperature compensated to operate over the entire applicable temperature range of from −35° to +215° F. Tests have revealed that the structure of the invention is quite insensitive to the drop in voltage across the terminals of the automobile battery. It is, however, very sensitive to the rate at which the voltage across the battery changes and, when the rate-of-change of the voltage across the battery is greater than a predetermined rate, a signal is fed to and activates an SCR. A resistive load applied to an automobile battery will cause a sudden drop in battery voltage and, therefore, activate the network of the invention. An inductive load applied to the automobile battery will not cause a sudden drop in battery voltage and, even though it may result in a very much larger drop of potential across the battery terminals that the resistive load, the inductive load will not cause activation of the network of the invention.

BRIEF DESCRIPTION OF THE DRAWING

The novel features that are considered characteristic of this invention are set forth with particularity in the appended claims. The invention itself, however, both as to its organization and method of operation will best be understood from the following description when read in connection with the accompanying drawing, wherein the Figure is a schematic diagram of a circuit in accordance with the principles of the present invention.

DESCRIPTION OF THE PREFERRED EMBODIMENT

Referring now to the drawing, there is illustrated a network in accordance with the principles of the invention. One terminal 10 of a siren motor 12, or some such other attention getting device, is coupled through a switch 14 to the positive terminal of a car battery. The switch 14 can be positioned in an unobvious place and, if desired be key operated. The other terminal 16 of the siren motor 12 is coupled to the anode terminal 18 of a power SCR 20. The cathode terminal 22 of the SCR 20 is coupled to ground. The gate terminal 24 and the cathode terminal 22 of the SCR 20 are coupled together through a resistor 24. Gate terminal 24 is coupled directly to the collector terminal 26 of a transistor 28 having an emitter terminal 30 and a base terminal 32. The anode terminal 18 of the SCR 20 is coupled to the anode terminal 34 of a rectifier 36, the cathode terminal 38 of the rectifier being coupled to the base terminal 32. The anode terminal 18 is coupled through a resistor 40 to the emitter terminal 30 and a capacitor 41 is coupled between the emitter 30 and a ground terminal; and the cathode terminal 22 is coupled through a resistor 42 to the base terminal 32. The cathode terminal 22 of SCR 20 is coupled to ground.

A hood light or, if one is not present, normally open contacts 44 which close when the hood is opened are coupled through a resistor 46 is series with a capacitor 48 to ground. The junction of the resistor 46 with the capacitor 48 is coupled to anode terminal 18 of the SCR 20.

The transistor 28, which is a PNP transistor, is the voltage sensing transistor. The emitter 30 of the transistor is coupled to the RC network of resistor 40 and capacitor 41. The capacitor 41 charges up to the battery voltage within seconds after the network is set. The base 32 of transistor 28 is connected to a biasing circuit consisting of the diode 36 and resistor 42. The collector 26 of the transistor 28 is connected directly to the gate terminal 24 of the SCR 20.

At room temperature, the base voltage of the transistor 28 must be approximately 0.6 volts lower than the emitter voltage for the transistor to conduct. When the network is set and operating, the emitter voltage is equal to the full battery voltage and the base is about 0.4 volts lower thru the action of the diode 36 and the resistor 42. Thus, the transistor is back biased by substantially 200 milivolts. This threshold voltage of 200 milivolts is maintained throughout the entire temperature range by matching the diode 36 and the transistor 28. For example, both the diode and the transistor should be of the same basic material such as silicon.

When a negative going pulse appears at the 12 volt source (such as would occur by coupling a resistive load to a car battery) it travels through the low resistance winding of the motor to the point 50. However, because of resistor 40 and capacitor 41, the negative going pulse signal does not appear instantaneously at the emitter 30 of transistor 28. However, the pulse signal is fed without being attenuated to the base terminal 38 of the transistor 28. If this pulse signal is larger than 200 milivolts it will cause transistor 28 to become conductive. Capacitor 41 will discharge through transistor 28 to appear as a positive going pulse signal at the gate terminal of SCR 20 to trigger the SCR into conduction. Resistor 24 serves as a low impedance load at the gate terminal of SCR 20 to prevent false triggering. The capacitor 41 is sized to hold a charge sufficient to fire the SCR under the worst environmental conditions. Resistor 40 is sized to provide a time constant short enough to discharge the capacitor 41 by any negative going pulse signal which does not have a rise-rate that is sufficiently short. It is this time constant which makes the circuit insensitive to inductive loads.

Capacitor 48 in combination with the inductance of the motor 12 of the siren functions as a filter for radio frequency interference. Resistor 46 is a current limiting resistor in those instances where a hood lamp is not used and external hood contacts are required. The hood contacts are required to provide protection for the hood if no hood lights are present on the car.

In many instances, a car may have valuable accessories such as a radio, a tape deck unit and the like which are subject to unauthorized removal. In this invention, the addition of two resistors 52, 54 offers closed circuit protection for accessories. In this instance, the junction of the resistors 52, 54 is connected to ground through the item that is to be protected. If the accessory being protected is removed, the alarm will be triggered. Under normal conditions, the junction of the resistors 52, 54 is grounded. In this instance, resistor 54 appears as if it is in shunt with resistor 24; and, resistor 52 appears as if it is in shunt with the entire network. The voltage sensing properties of the network are not affected. However, when the junction of the resistors 52, 54 is disconnected from ground, current will flow from point 50 through resistors 52, 54 and will cause a positive pulse signal at the gate terminal of SCR 20 thus triggering the alarm.

The SCR is used to maintain the siren operative once activated.

Typical values of the various components of the network described and illustrated can be as follows:

| | | | |
|---|---|---|---|
| resistor 46 – | 330 ohms | capacitor | 48 – .01 uf |
| resistor 40 – | 1,000 ohms | capacitor | 41 – 0.5 uf |
| resistor 24 – | 100 ohms | SCR | 20 – 40575 |
| resistor 42 – | 22,000 ohms | transistor | 28 – 2N5139 |
| resistor 52 – | 680 ohms | diode | 36 – 1N914 |
| resistor 56 – | 220 ohms | | |

Obviously, many modifications and variations of the present invention are possible in the light of the above teachings. It is therefore, to be understood that within the scope of the appended claims the invention may be practiced otherwise than as specifically described.

What is claimed is:

1. An alarm device for indicating the unauthorized use of a vehicle of the type having a voltage source and one or more load devices adapted to be energized by said voltage source, comprising warning means adapted when activated to draw attention to said unauthorized use, first switch means operatively connected to said warning means and effective when actuated to activate said warning means, and second switch means operatively connected to said voltage source and to said first switch means, responsive to the rate of change of voltage across said voltage source, and effective to electrically connect said first switch means to said voltage source thereby to actuate said first switch means only when said rate of change of voltage exceeds a predetermined value corresponding generally to that resulting from the energization of a resistive load device, whereby said warning means is activated only in response to the energization of a resistive load device.

2. The structure of claim 1, wherein said second switch means comprises a transistor network.

3. The structure of claim 1 wherein said switch means comprises a latching switch.

4. The structure of claim 1 wherein said switch means comprises an SCR.

5. The structure of claim 4 wherein said warning means comprises an audio device.

6. The structure of claim 1 including a pair of resistors connected in series with each other and in parallel with said second switch means, and means coupling the junction of said first and second resistors to a ground terminal through an accessory of the vehicle that is to be protected from unauthorized appropriation.

7. An alarm as defined in claim 1, wherein said voltage source has first and second terminals, said first switch means includes a control terminal, and wherein said second switch means comprises a switching device having a control terminal and first and second output terminals defining an output circuit, the output circuit of said switching device being operatively connected between said first terminal of said voltage source and said control terminal of said first switch means and effective when rendered conductive to operatively electrically connect said control terminal of said first switch means to said first terminal of said voltage source, thereby to actuate said first switch means, said switching device being rendered conductive upon the application of a potential difference of a given magnitude, between its control terminal and its first output terminal, and means operatively connecting said first output terminal and said control terminal of said switching device to said first terminal of said voltage source and effective to vary the rate of change of voltage of said first output terminal relative to that of said control terminal of said switching device as a function of the rate of change voltage at said first terminal of said voltage source, thereby to selectively render said switching device conductive in response to a rate of change of voltage at said voltage source exceeding said predetermined value.

8. An alarm as defined in claim 1, wherein said voltage source has first and second terminals and wherein said second switch means comprises a switching device operatively connected between said first terminal of said voltage source and said first switch means.

9. An alarm as defined in claim 8, wherein said switching device comprises a semiconductor transistor having its emitter and base terminals operatively connected to said first terminal of said voltage source and its collector terminal operatively connected to said first switch means.

10. The alarm as defined in claim 7, wherein said rate-of-change of voltage varying means comprises an RC circuit operatively connected to said voltage source and to said control terminal of said switching device.

11. The alarm as defined in claim 10, wherein said RC circuit comprises a resistor and a capacitor connected in series across said voltage source, said control terminal of said switching device being connected to the junction between said resistor and said capacitor.

12. The structure of claim 7, wherein said first switch means comprises a latching switch.

13. The alarm as defined in claim 12, wherein said rate-of-change of voltage varying means comprises an RC circuit operatively connected to said voltage source and to said control terminal of said switching device.

14. The alarm as defined in claim 13, wherein said RC circuit comprises a resistor and a capacitor connected in series across said voltage source, said control terminal of said switching device being connected to the junction between said resistor and said capacitor.

15. The structure of claim 9, wherein said switch means comprises a latching switch.

* * * * *